(12) United States Patent
Chang

(10) Patent No.: US 7,287,937 B2
(45) Date of Patent: Oct. 30, 2007

(54) MULTI-FUNCTION MILLING CUTTER

(76) Inventor: Hsin-Tien Chang, No. 21, Lane 85, Yongfong Rd., Taiping (TW)

( * ) Notice: Subject to any disclaimer, the term of this patent is extended or adjusted under 35 U.S.C. 154(b) by 0 days.

(21) Appl. No.: 10/914,323

(22) Filed: Aug. 9, 2004

(65) Prior Publication Data

US 2006/0029474 A1    Feb. 9, 2006

(51) Int. Cl.
*B23C 5/20* (2006.01)
(52) U.S. Cl. .......................... 407/48; 407/54; 408/231; 408/713
(58) Field of Classification Search ................ 408/227, 408/229, 230, 231, 233, 713; 407/40, 48, 407/53, 54; *B23C 5/20*
See application file for complete search history.

(56) References Cited

U.S. PATENT DOCUMENTS

| | | | | | |
|---|---|---|---|---|---|
| 4,047,826 | A | * | 9/1977 | Bennett | 408/59 |
| 4,632,608 | A | * | 12/1986 | Blomberg et al. | 407/114 |
| 5,259,707 | A | * | 11/1993 | Keller | 408/233 |
| 5,765,973 | A | * | 6/1998 | Hirsch et al. | 408/188 |
| 5,893,683 | A | * | 4/1999 | Johnson | 407/42 |
| 7,021,182 | B2 | * | 4/2006 | Edler | 82/121 |

* cited by examiner

*Primary Examiner*—Cheryl Tyler
*Assistant Examiner*—Sara Addisu

(57) ABSTRACT

A multi-function miller cutter includes a shank with a receiving portion defined in the shank at an end of the shank. A threaded hole is defined in the receiving portion so as to secure a disposable cutter. An angle is defined between an axis of the shank and a center of the threaded hole.

8 Claims, 14 Drawing Sheets

MULTI-FUNCTION MILLING CUTTER

FIELD OF THE INVENTION

The present invention relates to a milling cutter that is able to mill, drill and cut.

BACKGROUND OF THE INVENTION

A conventional drill bit 1 is disclosed in FIG. 18, and is generally made from alloy steel or high speed steel which is hard and is difficult to be cut. Thus, drill bit 1 is expensive. For a drill bit 1 with an outer diameter of 16 mm, it costs 100 U.S. dollars. This kind of drill bit 1 can be used in a universal machine to drill, cut, mill and/or groove. Nevertheless, the conventional drill bit 1 includes the following shortcomings which are:

1. The conventional drill bit 1 is made in one piece and expensive, although it performs different functions and reduces times of replacement of the drill bits.
2. Once there is a crack or damage, a special grinding machine is needed to grind the drill bit. This is a time-consuming job.
3. The drill bit has to be centered again after it is ground or disengaged from the machine. This takes considerable time.
4. The drill bit has to be discarded if it is worn too much and the length of the drill bit is too short.

The present invention intends to provide a multi-function milling cutter that includes a receiving portion for connecting a disposable cutter having edges and a nose that are able to perform different functions.

SUMMARY OF THE INVENTION

The present invention relates to a multi-function milling cutter that comprises a shank and a receiving portion defined in the shank at an end of the shank. A threaded hole is defined in the receiving portion, and a disposable cutter is securely engaged with the threaded hole in the receiving portion. An angle is defined between an axis of the shank and a center of the threaded hole.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
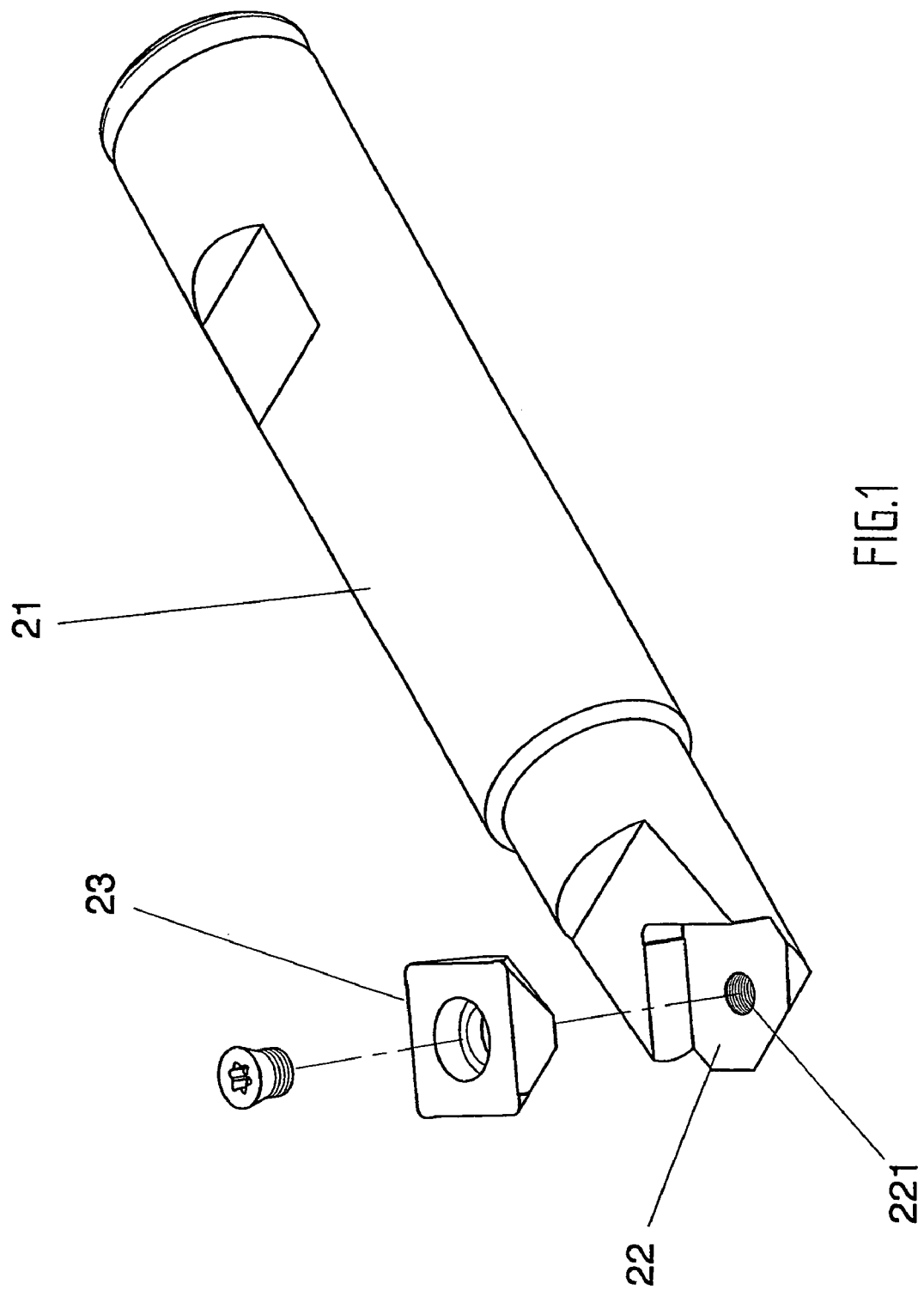
FIG. 1 is an exploded, perspective view of the present invention.
Figure 2:
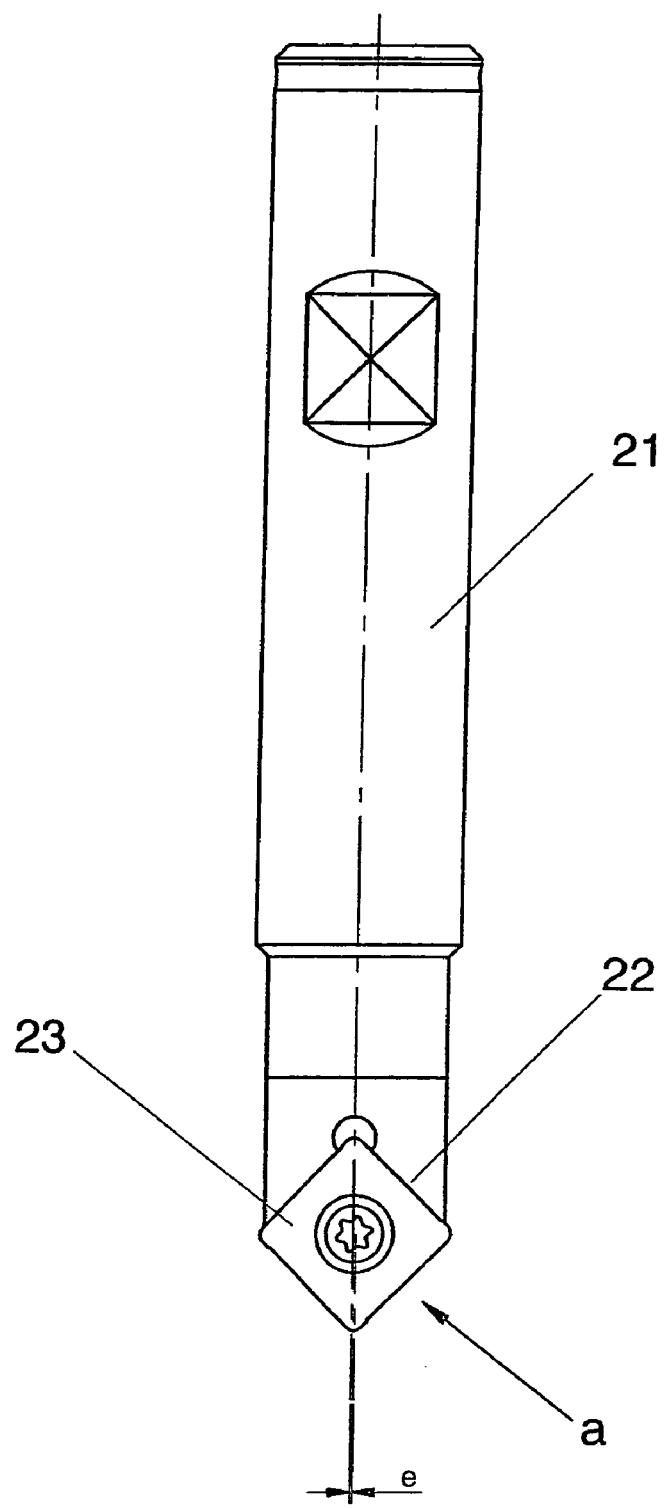
FIG. 2 is a front view of the present invention.
Figure 3:
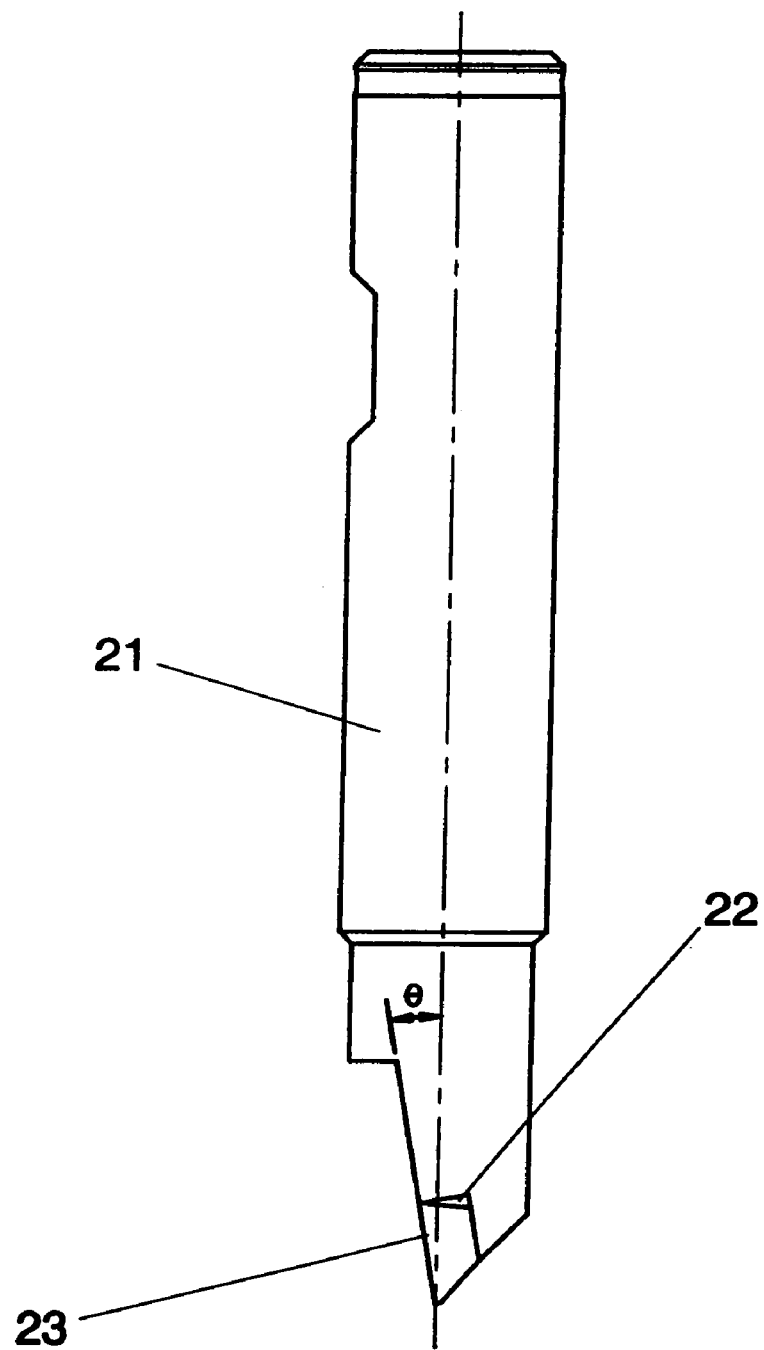
FIG. 3 is a side view of the present invention.

Referring to FIGS. 1 to 3, the multi-function milling cutter of the present invention comprises a shank 21 and a receiving portion 22 defined in the shank 21 at an end of the shank 21. A threaded hole 221 is defined in the receiving portion 22 and an angle is defined between an axis of the shank 21 and a center of the threaded hole 221. The angle is so small that only 0.1 mm distance "e" is defined between the axis of the shank 21 and the center of the threaded hole 221. A diamond-shaped disposable cutter 23 is securely engaged with the receiving portion 22. Each side of the disposable cutter 23 is a cutting edge so as to perform different functions.

The bottom of the receiving portion 22 includes an inclined angle. A tip of the disposable cutter 23 is located forward of the receiving portion 22. By this specific arrangement, the thickness of the shank 21 at the portion of the receiving portion 22 can be made thicker to support the disposable cutter 23. One of the four tips faces downward such that when the shank 21 is rotated, only the cutting edge "a" that is offset performs the cutting function. The rest of the cutting edges are located within the radius of cutting so that they are not in contact with the object to be cut. Therefore, every cutting edge can be used.

Figure 6:
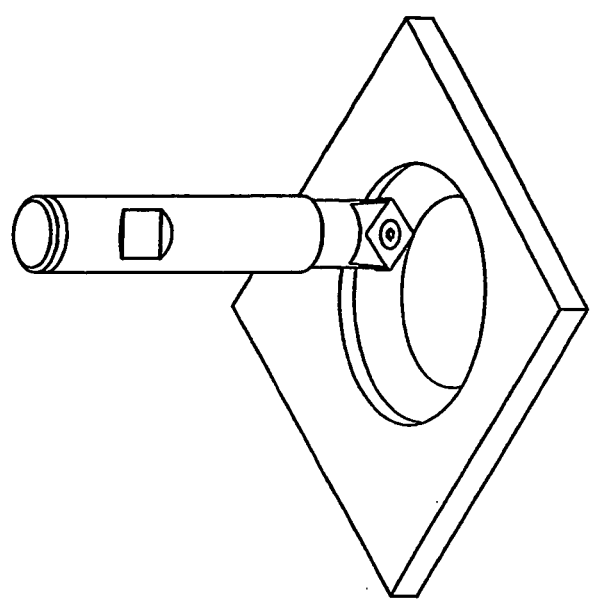
FIG. 6 shows that the cutter is making a sink hole.
Figure 5:
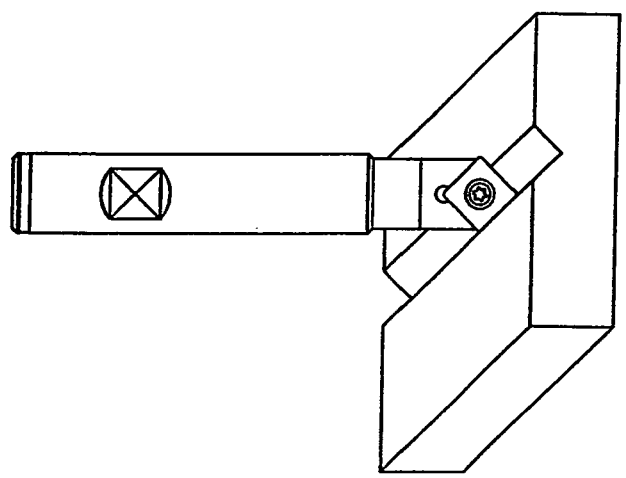
FIG. 5 shows that the cutter is making a V-shaped groove.
Figure 4:
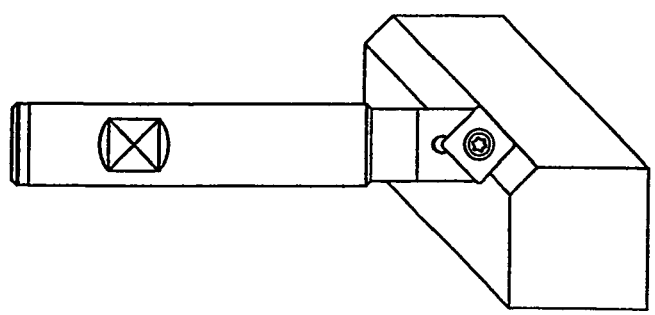
FIG. 4 shows that the cutter is making a rounded edge.

FIG. 4 which shows that the disposable cutter 23 is making a rounded edge. FIG. 5 shows that the disposable cutter 23 is making a V-shaped groove. FIG. 6 shows that the disposable cutter 23 is making a sink hole.

Figure 7:
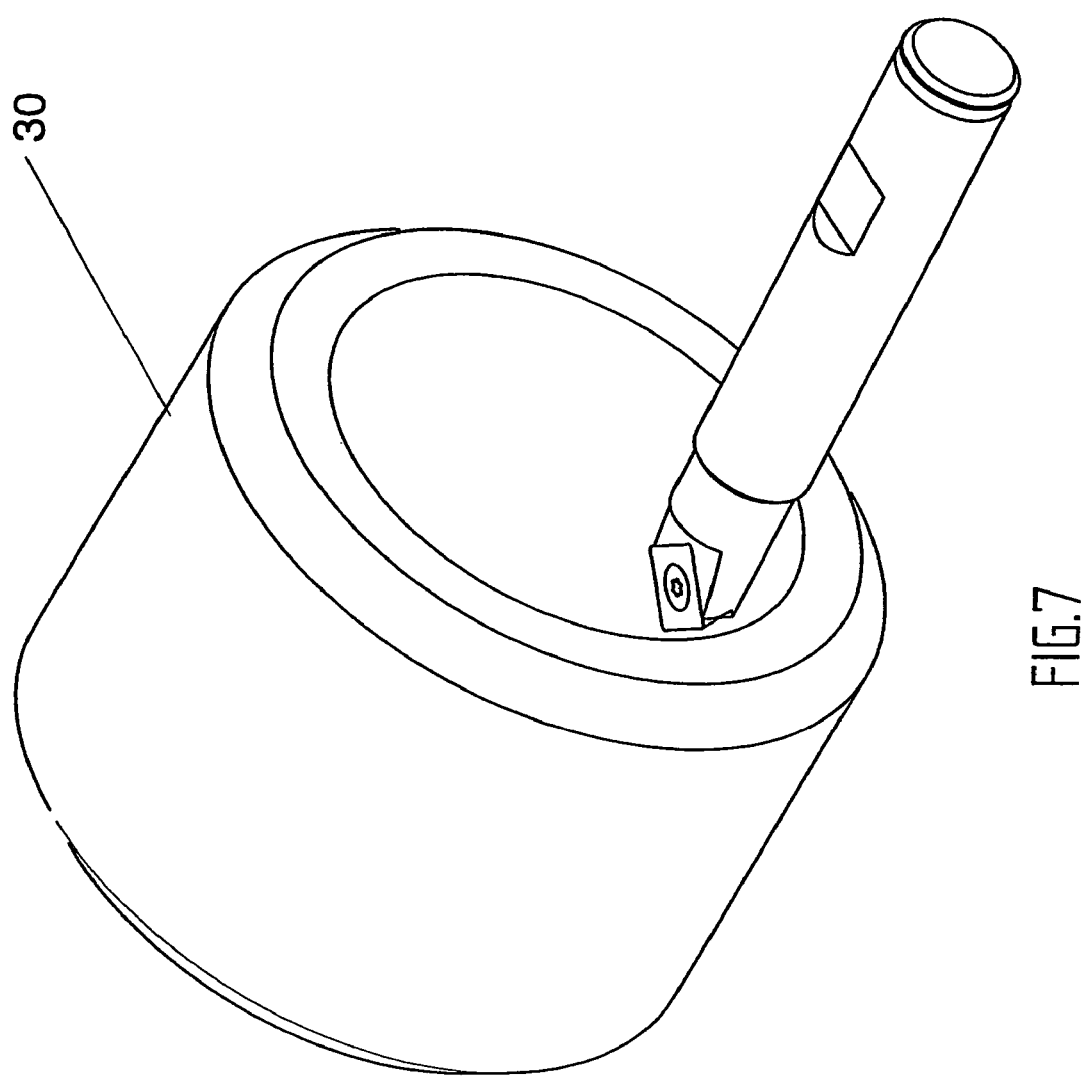
FIG. 7 shows that the cutter is making a hole.
Figure 8:
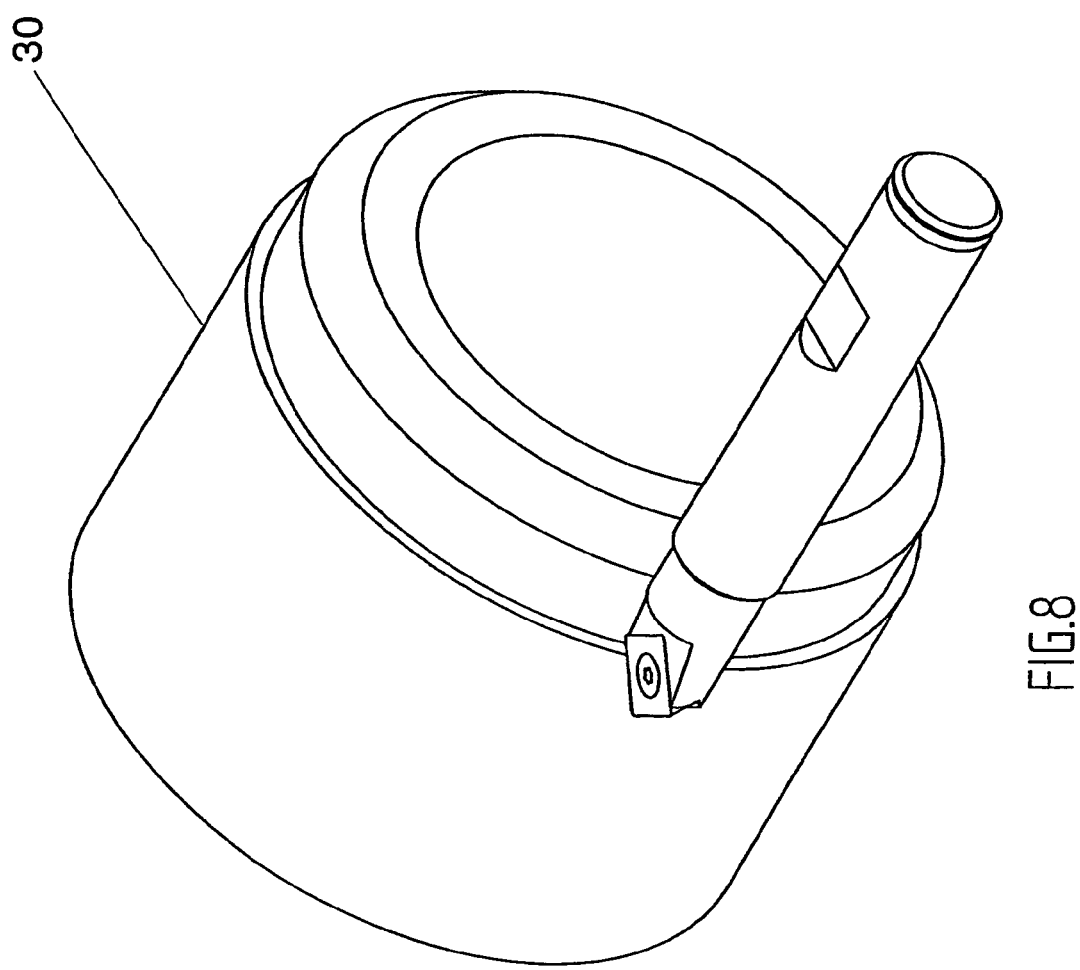
FIG. 8 shows that the cutter is trimming a tubular member.
Figure 9:
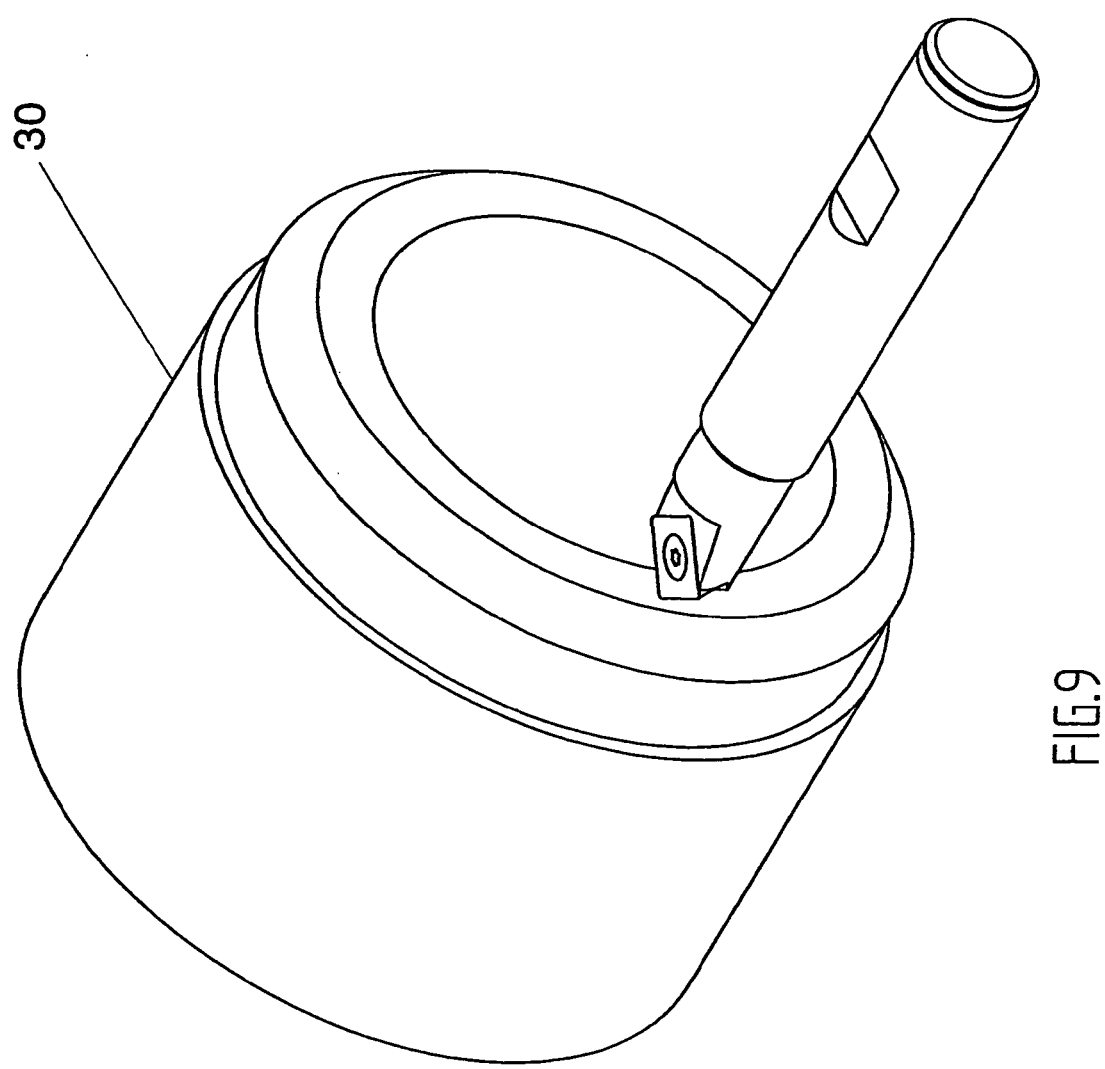
FIG. 9 shows that the cutter is proceeding an end cutting.

FIGS. 7 to 9 show the milling cutter as used with a lathe. Specifically, FIG. 7 shows that the milling cutter is making a hole in an object 30. FIG. 8 shows that the milling cutter is trimming a tubular member. FIG. 9 shows that the milling cutter is proceeding an end cutting. This allows the user to proceed with different functions without changing the cutter 23.

Figure 12:
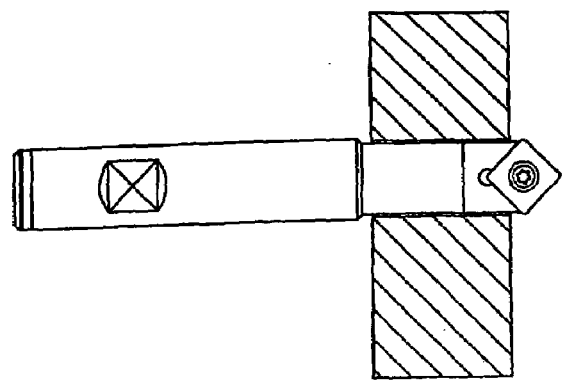
FIG. 12 shows that the cutter is drilling a hole.
Figure 11:
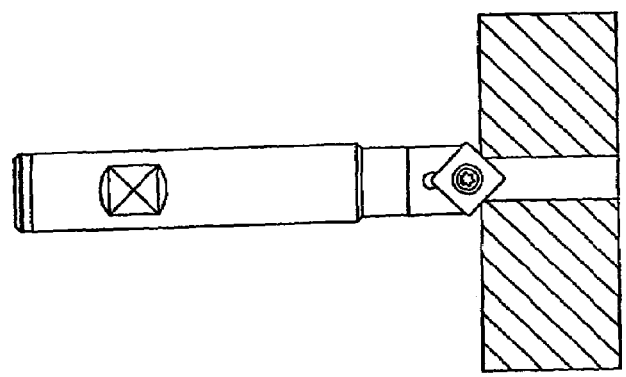
FIG. 11 shows that the cutter is rounding a periphery of a hole.
Figure 10:
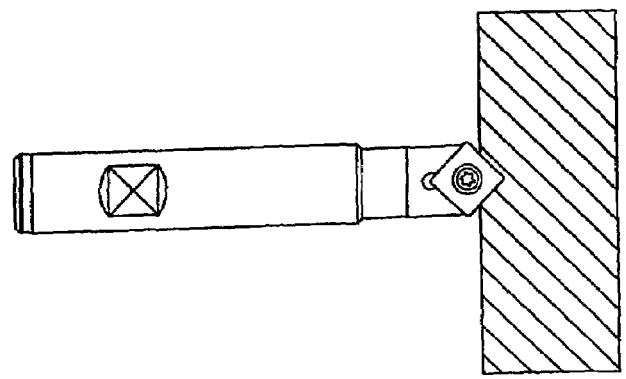
FIG. 10 shows that the cutter is making a central hole.
Figure 13:
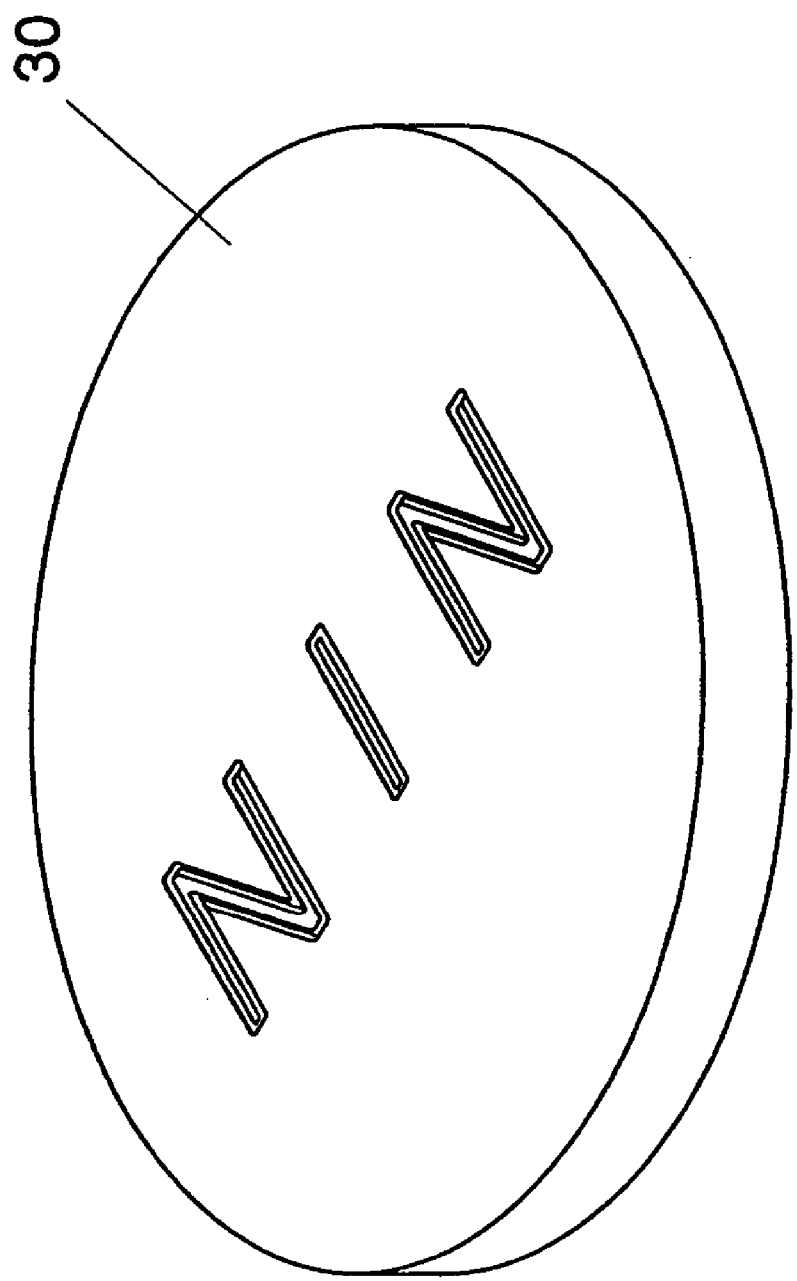
FIG. 13 shows that engraving on a surface made by the cutter.

FIG. 10 shows that the milling cutter is making a central hole. FIG. 11 shows that the milling cutter is rounding a periphery of a hole. FIG. 12 shows that the milling cutter is drilling a hole. FIG. 13 shows that the milling cutter has engraved on a surface of the object 30. The milling cutter can be cooperated with NC machines and makes desired patterns or words on the object 30.

Figure 14:
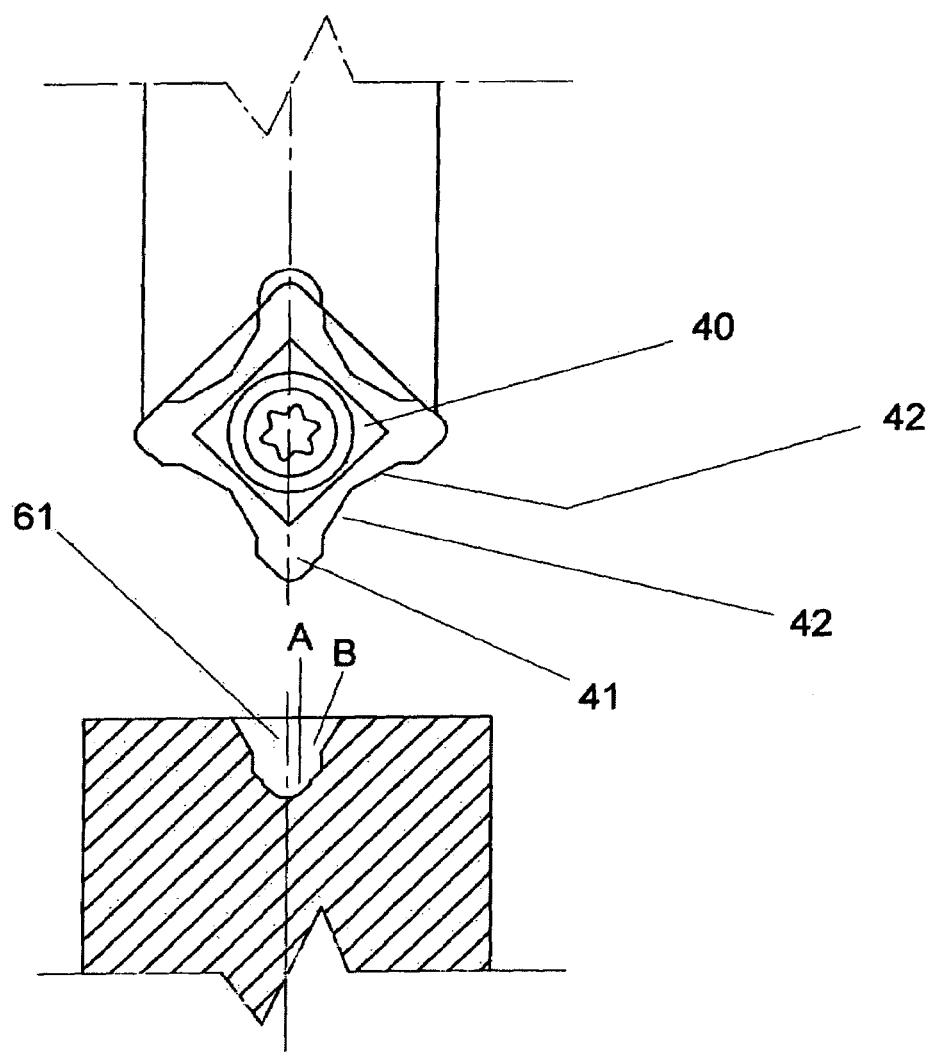
FIG. 14 shows an AB type disposable cutter for making an A type central hole and a B type central hole.

FIG. 14 shows the disposable cutter 40 in the form of an AB type center cutter that has a tip 41 and two cutting edges 42 between which the tip 41 is located. FIG. 14 shows that the AB type center cutter is able to make an A type central hole and B type central hole. If the AB type center cutter is used by its tip 41 and cutting edge 42, the A type central hole 61 includes a 60-degree taper hole. The AB type center cutter may also be used with a 60-degree centering pin to proceed heavy cutting and milling.

Figure 15:
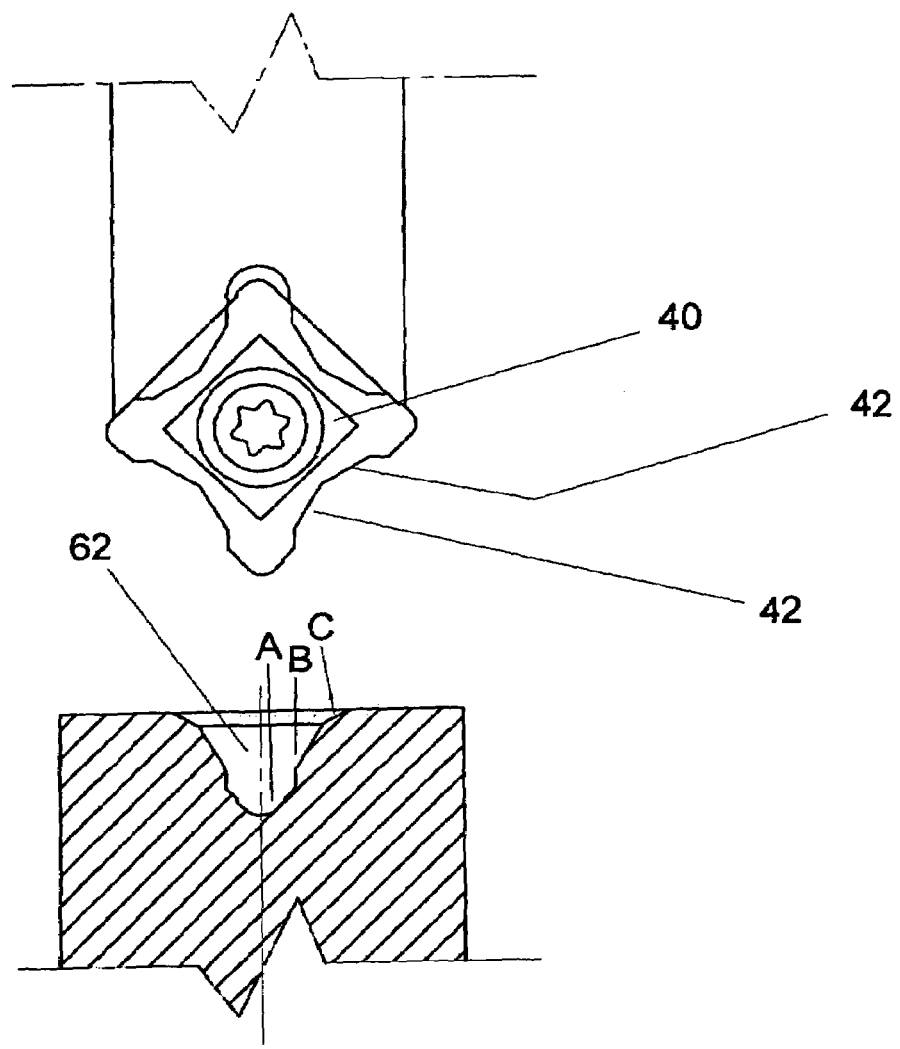
FIG. 15 shows the AB type disposable cutter for making an A type central hole, a deeper B type central hole and a rounded periphery C.

FIG. 15 shows that when the AB type cutter 40 drills a deeper B type hole 62 where the cutting edge 42 is simultaneously drilling a rounded periphery "C" of 120 degrees along the periphery of the hole 62. Even if the rounded periphery "C" is hit, the hole 62 is not affected.

Figure 16:
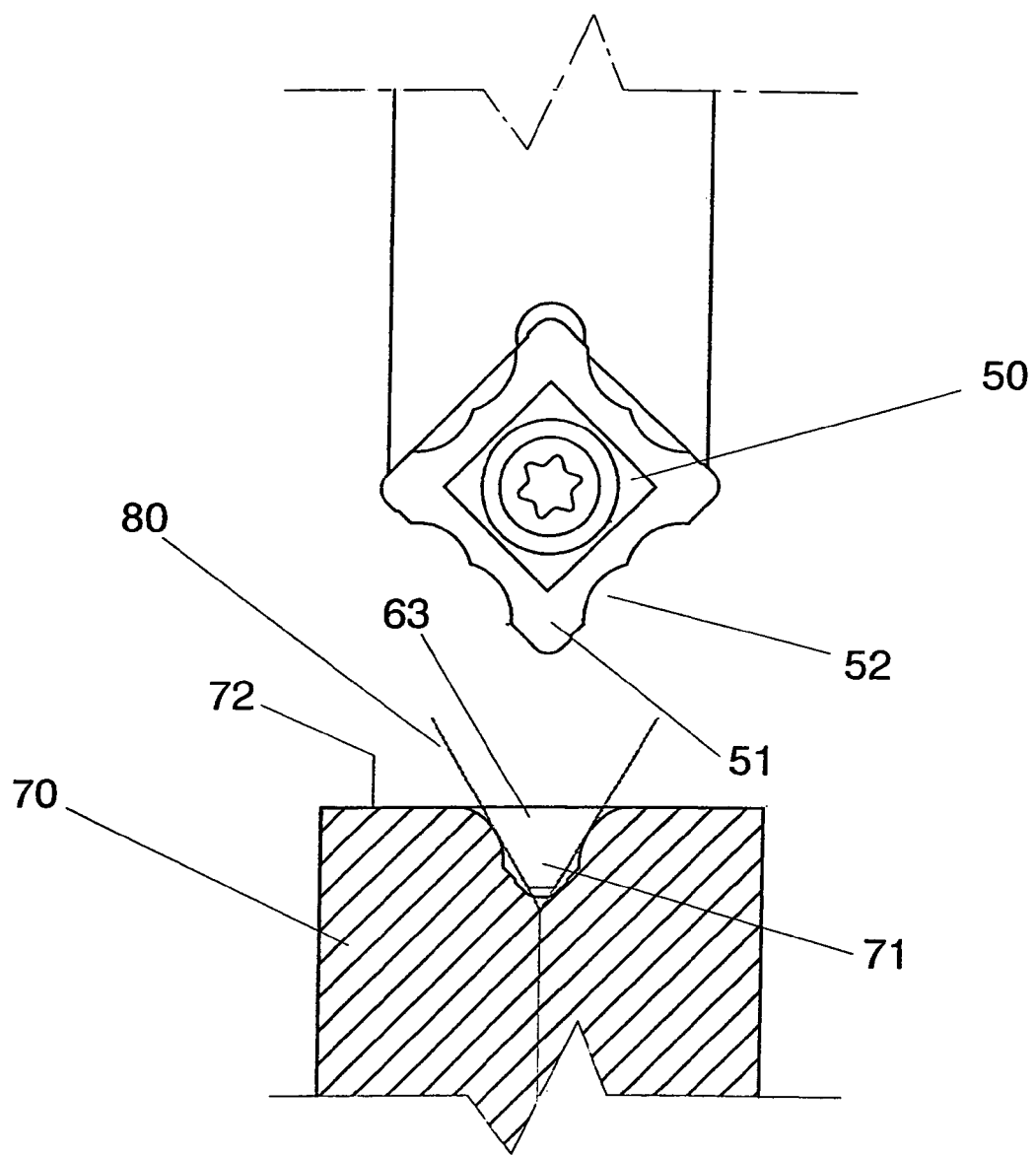
FIG. 16 shows an R type disposable cutter for making a R-type central hole.
Figure 17:
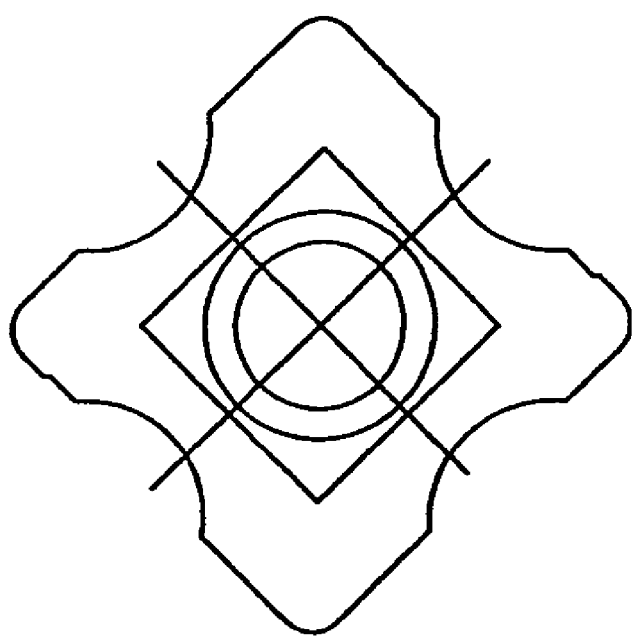
FIG. 17 shows the number of cutter edges of the disposable cutter.
Figure 18:
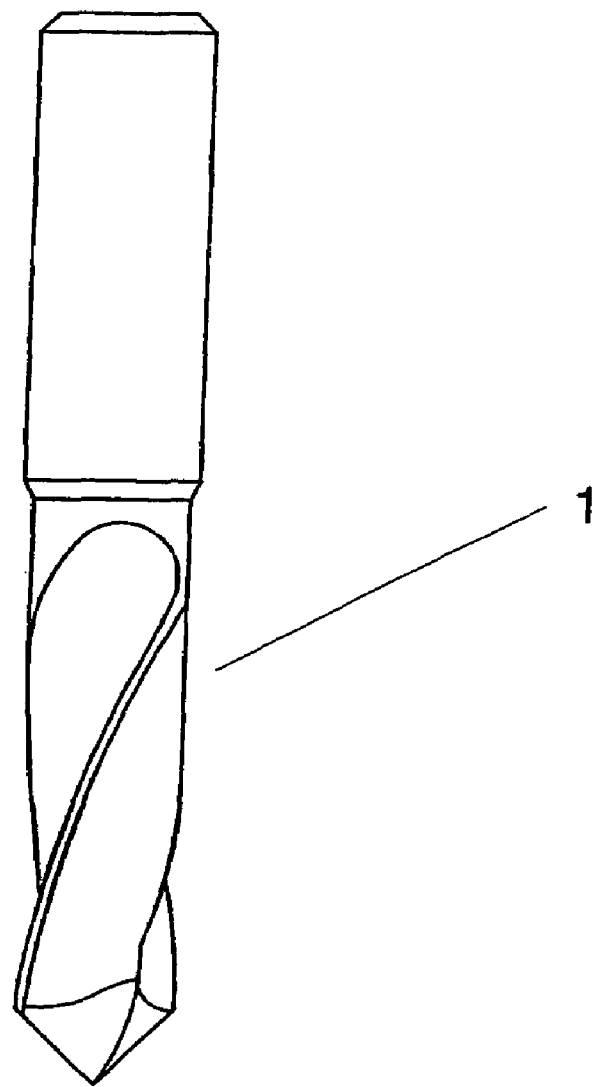
FIG. 18 shows a conventional drill bit.

FIG. 16 shows the disposable cutter 50 in the form of a R type center cutter that has a tip 51 and four curved cutting edges 52 located at four corners of the disposable cutter 50. The disposable cutter 50 makes an R type central hole 63, and the cutting edges 52 cut a two stepped sink hole 71 in the surface 72 of the object 70. The two stepped sink hole 73 contacts the centering pin 80 along a circle which is a small area. This is used for precision cutting. FIG. 17 shows that the number of cutter edges of the disposable cutter can be two.

The milling cutter can proceed with different functions so that it is not necessary to be replaced with different cutters 23, 40 and 50. Only the disposable cutter 23, 40 or 50 needs to be replaced. This saves time, and efficiency is increased.

While we have shown and described the embodiment in accordance with the present invention, it should be clear to those skilled in the art that further embodiments may be made without departing from the scope of the present invention.

What is claimed is:

1. A multi-function milling cutter comprising:

a shank having an axis and an end; a receiving portion defined in the shank, wherein the receiving portion includes a bottom of a flat, planar shape extending from the end of the shank at an inclined, nonparallel, acute angle to the axis of the shank; a threaded hole defined in the bottom of the receiving portion and having a center, with an angle defined between an axis of the shank and the center of the threaded hole to define a distance between the axis of the shank and the center of the threaded hole; and a disposable cutter being an R type center cutter and securely engaged with the receiving portion, the disposable cutter having a tip and four cutting edges located at four corners of the disposable cutter, the disposable cutter abutting with the bottom and located forward of the receiving portion and the end of the shank.

2. The milling cutter as claimed in claim 1 wherein the bottom of the receiving portion is entirely spaced from the axis of the shank.

3. The milling cutter as claimed in clam 2 wherein the bottom of the receiving portion terminates in a V-shaped shoulder extending perpendicular to the bottom, the disposable cutter engaged with the receiving portion abutting with the V-shaped shoulder and the axis of the shank extending through the V-shaped shoulder.

4. The milling cutter as claimed in claim 3 wherein a flat portion is defined in the shank and extends from and is perpendicular to the V-shaped shoulder away from the end of the shank and is parallel to the bottom of the receiving portion, the flat portion defining a plane intersecting the end of the shank at the axis of the shank, the flat portion and the bottom located on opposite sides of and not intersecting with the axis of the shank.

5. The milling cutter as claimed in claim 4 wherein the disposable cutter has a thickness generally equal to a spacing perpendicularly between the flat portion and the bottom.

6. The milling cutter as claimed in claim 5 wherein the flat portion terminates in an ending shoulder and extends at a nonparallel angle to the flat portion, the flat portion being intermediate the V-shaped shoulder and the ending shoulder.

7. The milling cutter as claimed in claim 6 wherein the disposable cutter has a top face, a bottom face, and side faces extending between the top and bottom faces, the bottom face being smaller than the top face and abutting with the bottom of the receiving portion, the end of the shank including an end face contiguous with one of the side faces and extending at an equal angle therewith.

8. The milling cutter as claimed in claim 1 wherein the disposable cutter has a top face, a bottom face, and side faces which extend between the top and bottom faces, the bottom face being smaller than the top face and abutting with the bottom of the receiving portion, the end of the shank including an end face contiguous with one of the side faces and extending at an equal angle therewith.

* * * * *